United States Patent
Le Quernec

[15] 3,688,581
[45] Sept. 5, 1972

[54] DEVICE FOR CORRECTING THE NON-LINEAR VARIATION OF A SIGNAL AS A FUNCTION OF A MEASURED MAGNITUDE

[72] Inventor: Francis Le Quernec, Solaise, France
[73] Assignee: Rhone-Poulenc S.A., Paris, France
[22] Filed: June 19, 1970
[21] Appl. No.: 47,678

[30] Foreign Application Priority Data
June 20, 1969 France.....................6920737

[52] U.S. Cl..............................73/362 AR, 323/75 H
[51] Int. Cl.............................................G01k 7/20
[58] Field of Search.......323/75 H, 75 N; 73/362 AR

[56] References Cited
UNITED STATES PATENTS

| | | |
|---|---|---|
| 3,503,261 | 3/1970 | Riester et al..........73/362 AR |
| 3,568,044 | 3/1971 | Elazar.....................323/75 N |
| 3,517,556 | 6/1970 | Barker..................73/362 AR |
| 3,383,920 | 5/1968 | Greenly................73/362 SC |
| 3,339,414 | 9/1967 | Coor......................73/362 AR |
| 3,441,846 | 4/1969 | Petrohilos.........73/362 AR X |
| 3,104,550 | 9/1963 | Weisheit et al........73/362 AR |

Primary Examiner—Louis R. Prince
Assistant Examiner—Frederick Shoon
Attorney—Stevens, Davis, Miller & Mosher

[57] ABSTRACT

An apparatus for correcting the error due to the non-linear variation in an output signal produced by an electrical system for measuring a physical quantity, e.g. temperature, by means of a probe, the electrical resistance of which is sensitive to the variation of the physical quantity, in which the maximum value of the error in the output signal to be corrected in the range of measurement considered is first determined. Then a correcting signal is applied as a compensating signal to one of the probe outputs, which signal is in the same ratio to said maximum error as the instantaneous output signal is to the value of the output signal which produces said maximum error. Conveniently the correcting signal is applied as a feedback signal from an output terminal of the system.

7 Claims, 3 Drawing Figures

Inventor
FRANCIS LE QUERNEC

Inventor
FRANCIS LE QUERNEC

DEVICE FOR CORRECTING THE NON-LINEAR VARIATION OF A SIGNAL AS A FUNCTION OF A MEASURED MAGNITUDE

The present invention relates to an apparatus for correcting the error due to the non-linear variation of an output signal of a measuring system as a function of the measured quantity.

It is known to measure quantities, such as a temperature, a mechanical strain, the concentration of a solute in a solution and so forth, by means of electrical resistance probes connected to a measuring circuit comprising an amplifier. Such devices supply a signal, the variation of which as a function of the measured quantity is generally non-linear. An error therefore appears; this error is already troublesome in the case where an output is displayed in analogue form, because it often necessitates a correction to be obtained after calibration. However, it is generally unacceptable in the case of digital output display, because the corrections after calibrations are no longer possible.

Various correcting devices and processes have been proposed for substantially linearising the variation of the amplifier output signal as a function of the measured quantity. Hitherto, these processes and devices have necessitated the use of electrical or electronic components having relatively complex functions, such as diodes, transistors and so forth, and generally they result only in approximate and sometimes inadequate corrections.

According to the present invention there is provided an electrical measuring system comprising a resistance bridge type measuring circuit; power supply inputs at one pair of diagonally opposite points of said bridge circuit; first and second signal outputs of said bridge circuit; a power supply; conductors connecting said power supply to said power supply inputs of said bridge circuit; a measuring probe, the electrical resistance of which is sensitive to the variation of a physical quantity to be measured; further conductors connecting said probe to said first signal output and to one of said power supply inputs; an operational amplifier; a positive input of said operational amplifier; an output of said operational amplifier; an electrical connection between said first bridge circuit output and said positive input of said operational amplifier, wherein, in order to correct the error due to the non-linear variation of the output signal of the system, the improvement comprises an electrically resistive element connected, on the one side, to said operational amplifier output and, on the other side, directly to a point on the electrical path between said probe connection and said positive input of said operational amplifier via said first bridge circuit output, the ohmic value of said electrically resistive element being effective to produce a correcting potential difference which is fed back to said positive input of said operational amplifier, said correcting potential difference being proportional to the amplifier output signal, the maximum value of said correcting potential difference compensating the maximum value of error to be corrected in the range of measurement considered.

The invention will now be described, by way of example only, with reference to the accompanying drawings, wherein.

Figure 1:
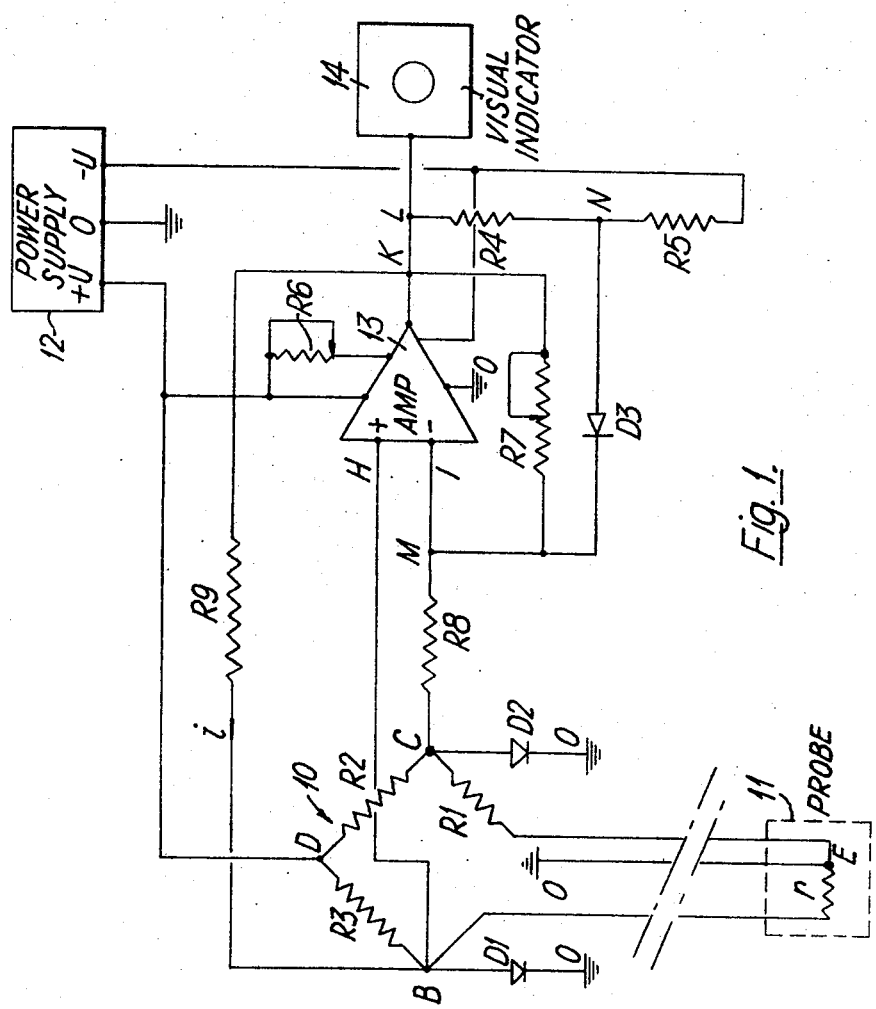
FIG. 1 shows the circuit diagram of a temperature measuring system including an electrical resistance probe.

The circuit shown in FIG. 1 includes a measuring bridge 10 comprising three resistors of constant predetermined resistance values R1, R2 and R3, and a variable electrical resistance $r$ of a measuring probe shown schematically at 11.

The excitation voltage of the bridge is applied from a source 12 to between the points E and D. The output signal of the bridge 10 appears between the points B and C. This signal is generally very weak, since the current passing through the probe 11 must not substantially alter the temperature of the probe 11. It is therefore necessary to amplify this signal by means of an operational amplifier 13.

The amplifier 13 is connected to the points B and C of the bridge 10 by two inputs, one input H being positive and the other I being negative. The point C is connected by way of a resistor R8 to the input I. The amplifier output K is connected to the negative input at M by a feedback device which includes a variable resistor R7. The ratio of the resistance of the resistor R7 to that of a resistor R8 defines the amplifier gain, that is to say, the extent of the measuring range. This gain can be adjusted to a desired value by regulation of the resistor R7. A variable resistance R6 permits regulation of the amplifier zero.

The signal supplied by the amplifier 13 is received by an appropriate receiving element 14 permitting either direct reading, or its recording or its transmission, for example, to a computing element. This receiving element 14 may supply analogue indications or provide a digital display.

In addition, it is advantageously possible to protect the amplifier against excess voltage, for example, as follows:

Two diodes D1 and D2 are connected to a common point O and respectively to the points B and C to prevent excess voltage being transmitted to the amplifier inputs H and I. These diodes limit the voltage at the amplifier inputs, for example in the case of an accidental break in the probe circuit, or in the case of switching of the probe in a multiple input apparatus.

A diode D3 is connected with its cathode to the input M and its anode to a junction N of a potential divider comprising resistors R4 and R5 primarily to prevent positive and negative excess voltages affecting the input I and the output K. As a secondary feature the diode D3 also serves to protect the receiving element 14. The resistors R4 and R5 are connected in series between the amplifier 13 output and a negative supply terminal -U of the source 12. In use the resistors R4 and R5 are adjusted according to the maximum output voltage.

Figure 2:
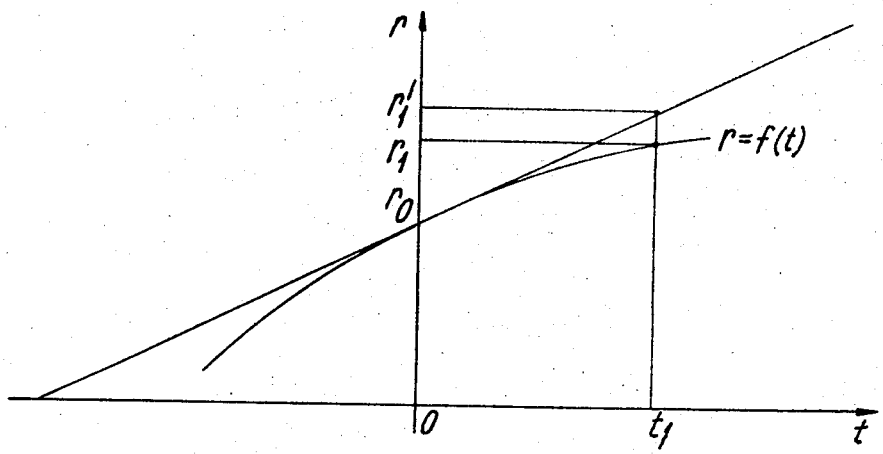
FIG. 2 shows the curve of variation of the probe resistance as a function of the measured temperature.

The electrical resistance $r$ of the probe 11 varies as a function of the measured quantity according to a law which is generally non-linear. Thus, for a temperature $t$, the law may be written in the form: $r = r_o(1 + At + Bt^2)$, $r_o$, A and B being constants depending on the nature of the probe. The curve of $r = f(t)$ giving the variations of $r$ as a function of $t$ is shown in FIG. 2.

Figure 3:
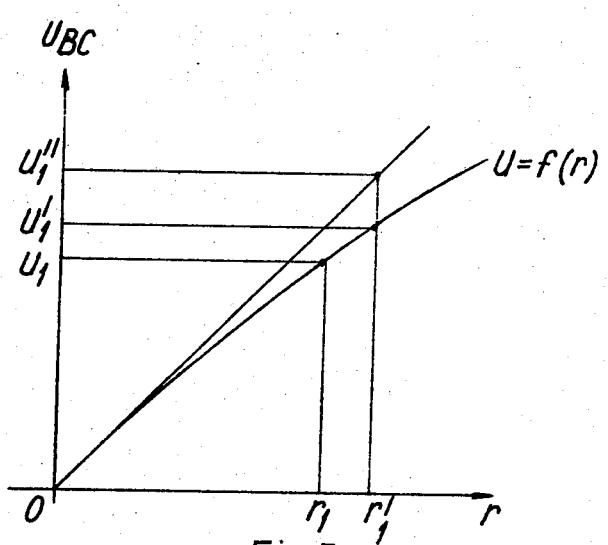
FIG. 3 shows the curve of the output signal variation of the measuring system as a function of the resistance of the probe; the curve shows the errors which have to be corrected by the system according to the invention.

The signal supplied by the amplifier is proportional to the output potential difference $U_{BC}$ of the bridge 10 between the points B and C. It is known that this potential difference is a non-linear function of the electrical resistance $r$ of the probe 11. The curve $u = f(r)$ giving the variations of $U_{BC}$ as a function of $r$ is shown in FIG. 3.

In the intervals considered, the curves $u = f(r)$ and $r = f(t)$ are continuous curves whose concavities face the same direction. In these ranges, therefore, they have no discontinuity or point of inflection.

To obtain directly the value of a physical quantity by a signal which is proportional to the measured quantity, it is thus necessary to correct a double error.

Since the physical quantities measured vary continuously in the ranges considered, it is possible to compare the ordinates $r_1$ and $r'_1$ of a point corresponding to a temperature $t_1$ on the curve $r = f(t)$ and on the tangent at the point of zero abscissa. It is also possible to compare the ordinates $u_1$, $u'_1$, $u''_1$ of the points corresponding to the resistances $r_1$ and $r'_1$, situated on the curve $u = f(r)$ and on its tangent to the curve of the origin. It is possible to deduce therefrom the error $\Delta U_{BC} = u''_1 - u_1$, introduced in the absence of any correction. This error is equal to the algebraic sum of the errors made in the variations of $u$ as a function of $r$, and of $r$ as a function of $t$.

This double error may be practically eliminated and a signal may be obtained, which is proportional to the physical quantity measured by producing artificially at the output of the measuring system between the points B and C a potential difference corresponding to the algebraic sum of the two aforesaid errors. This corrective potential difference may be produced by any appropriate electrical or electronic device.

The following solution, however, is preferred:

It has been found possible to produce artificially such a corrective potential difference if a current I, proportional to the amplifier output signal, is sent directly from the amplifier output to that end of the measuring probe which is connected to the positive input of the amplifier. For this purpose, there is added to the circuit so far described at least one resistor such as R9 which, as shown in FIG. 1, connects together the point K, which is a point situated at the amplifier output, and a point situated on the lead connecting the end of the measuring probe 11 to the positive input H of the amplifier, the electrical resistance of this lead being assumed to be negligible. For reasons of convenience, the point on the probe lead may coincide, for example and as shown in FIG. 1, with the point B of the measuring bridge.

This circuit thus provides simultaneously a feed-back which determines the gain of the amplifier and a positive reaction enabling the desired correction to be made.

The resistor R9 may consist either of a single resistor or of several resistors connected in conventional manner in series and/or in parallel.

It is possible to calculate the value of the resistor R9 in the following manner. A value $t_m$ of the measured quantity is selected for which the error is a maximum. This value $t_m$ may be selected by a person versed in the art by any conventional means according to the form of the curves $u = f(r)$ and $r = f(t)$. It is possible to select, for example, for $t_m$ the maximum value of $t$ in the range considered; a maximum error $\alpha U_{m,BC}$ corresponds to this value of $t_m$. Ohm's law is used for calculating the current $i$ necessary for effecting the correction of potential which exactly compensates the error $\Delta U_{m,BC}$. Then, knowing the value of this current $i$, a fresh application of Ohm's law supplies the value of the resistor R9. This value, calculated for the value $t_m$, is generally suitable throughout the entire extent of the range considered. The value of the resistor R9 may then be adjusted according to the particular conditions of use. If desired, a variable resistor R9 may be provided.

Determination of the other components is carried out in the conventional manner. The error due to the non-linear variation of the voltage as a function of the electrical resistance $r$ of the probe may advantageously be substantially reduced by selecting, for $R_2$ and $R_3$, very high values relative to the values of $r$ and $R_1$, so as to maintain substantially constant supply currents in the two branches of the bridge. Preferably, $R_2 = R_3$. Furthermore, a high input impedance of the amplifier 13 renders the value of the current due to an unbalance of the bridge negligible compared with the supply current.

The amplifier may be of any known type usually employed with this type of circuit. Preferably the open loop gain is higher than $10^4$. The value of the feed-back resistor R7 is selected in the usual manner as a function of the desired gain.

The system according to the invention may be varied in a number of ways. For example, the resistor R9 may be connected to a point K situated at the output of the amplifier by means of a potential divider composed of resistors. The signal supplied by the amplifier may be a voltage or a current. The measuring circuit may be formed in the usual manner, most often of one of the usual types of measuring bridges, etc., but the scope of the present invention is not exceeded if the essential features which have been defined are retained.

The apparatus, which has been described with reference to temperature measurement, is capable of numerous other applications. They are suitable in fact for the measurement of physical quantities capable of causing the electrical resistance of a measuring probe to vary continuously without inflection in the range considered. Other examples of physical quantities which may be measured are mechanical strains, concentration of a solute in a solution, and so forth.

Depending on the applications, any probe whose electrical resistance is sensitive to the variation of the physical quantity measured, may be used as measuring probe. Thus, it is possible to employ a strain gauge for measuring the variation in mechanical strains, a thermistor or a resistance of copper, nickel, platinum or suitable alloy for measuring temperatures, and a resistance probe for solutes.

As an example, the application of the process described to the measurement of temperatures by digital display may be mentioned.

Temperature measuring apparatus, provided with a resistance probe, give a value of the measured temperature by digital display, but the indication supplied by such apparatus does not correspond to reality; apparatus of this kind may be advantageously equipped with a correcting device according to the invention.

EXAMPLE

Measurement of a temperature to 0.1° C, in a range of 400° C between −200° C and +200° C.

The measuring probe used is a platinum resistance probe $r$, according to the standard DIN No. 43,760, the value of which is equal to 100.00Ω at 0° C.

The measuring apparatus is a digital voltmeter 14, the range of which is equal to 2,000 points and the input voltage of which is between ±2 volts. This apparatus thus makes it possible to display a temperature to 0.1° C in a range between 0° and +200° C, and by reversal of the polarities of the input signal a temperature of between −200° C and 0° C.

The probe $r$ and the digital voltmeter 14 are connected to a measuring circuit and to an amplifier 13 according to the circuit diagram shown in FIG. 1.

The different components of the circuit have the following characteristics:

Supply voltage: $U = \pm 15$ V
Voltage amplifier A: open loop gain: $10^5$
   impedance: 250,000Ω
Amplifier output voltage: between ±2 V
Diodes D1, D2, D3: semiconductor diodes capable of passing a current of 5 mA, a reverse voltage at least equal to 20 volts and a threshold voltage in the conducting or forward direction of between 0.4 and 0.8 volt.
Value of the resistors:
   R1 = 100Ω
   R2 = R3 = 10,000Ω
   R4 = 2,700Ω
   R5 = 10,000Ω
   R6, variable resistor between 50,000 and 100,000Ω
   R7, variable resistor between 10,000 and 200,000Ω
   R8, 1,000Ω

The resistor R9 is at first disconnected, then the following measurements are made successively (the temperatures being expressed in °C).

| Actual temperature | 0.0 | 40.0 | 50.0 | 75.0 | 100.0 | 150.0 | 200.0 |
|---|---|---|---|---|---|---|---|
| Displayed temperature | 0.0 | 40.8 | 51.1 | 76.4 | 101.5 | 151.0 | 200.0 |
| Error | 0.0 | 0.8 | 1.1 | 1.4 | 1.5 | 1.0 | 0.0 |

It is found that, under these conditions, the actual temperature is known only with an error which varies in the interval of the measuring range. This error may attain 1.5° C.

According to the invention, a resistor R9 = 130,000Ω is now connected according to the circuit shown in FIG. 1 and the previous measurements are repeated. The following results are obtained:

| Actual temperature | 0.0 | 40.0 | 50.0 | 75.0 | 100.00 | 150.0 | 200.0 |
|---|---|---|---|---|---|---|---|
| Displayed temperature | 0.0 | 40.0 | 50.0 | 75.0 | 100.0 | 150.0 | 200.0 |

It is found that the error due to the non-linear variation of the amplifier output signal as a function of the measured temperature is eliminated throughout the entire extent of the range considered. It is thus found that the system according to the invention may be carried out with considerable simplicity, and that it greatly increases the precision which may be effectively supplied by a digital display voltmeter in the entire extent of the available measuring range.

I claim:

1. In an electrical measuring system comprising a resistance bridge type measuring circuit; power supply inputs at one pair of diagonally opposite points of said bridge circuit; first and second signal outputs of said bridge circuit; a power supply; conductors connecting said power supply to said power supply inputs of said bridge circuit; a measuring probe, the electrical resistance of which is sensitive to the variation of a physical quantity to be measured; further conductors connecting said probe to said first signal output and to one of said power supply inputs; an operational amplifier; a positive input of said operational amplifier; an output of said operational amplifier; an electrical connection between said first bridge circuit output and said positive input of said operational amplifier, wherein, in order to correct the error due to the non-linear variation of the output signal of the system, the improvement comprises an electrically resistive element connected, on the one side, to said operational amplifier output and, on the other side, directly to a point on the electrical path between said probe connection and said positive input of said operational amplifier via said first bridge circuit output, the ohmic value of said electrically resistive element being effective to produce a correcting potential difference which is fed back to said positive input of said operational amplifier, said correcting potential difference being proportional to the amplifier output signal, the maximum value of said correcting potential difference compensating the maximum value of error to be corrected in the range of measurement considered.

2. A system as claimed in claim 1, further comprising an indicator device connected to said amplifier output.

3. A system as claimed in claim 2, in which said indicator device comprises a digital display apparatus.

4. A system as claimed in claim 1, in which the measuring probe is an electrical resistance thermometer probe.

5. A system as claimed in claim 1, further comprising a negative input of the amplifier, an electrical connection between said second bridge circuit signal output and said negative input, and a gain adjusting device connected between said amplifier output and said negative input.

6. A system as claimed in claim 1, further comprising excess voltage protection diodes connected to said first and second signal outputs of the bridge circuit.

7. A system as claimed in claim 1, in which said electrically resistive element is connected to said first signal output of the bridge circuit.

* * * * *